Aug. 28, 1923.
S. H. TODD
REFRIGERATING APPARATUS
Filed June 28, 1921
1,466,072
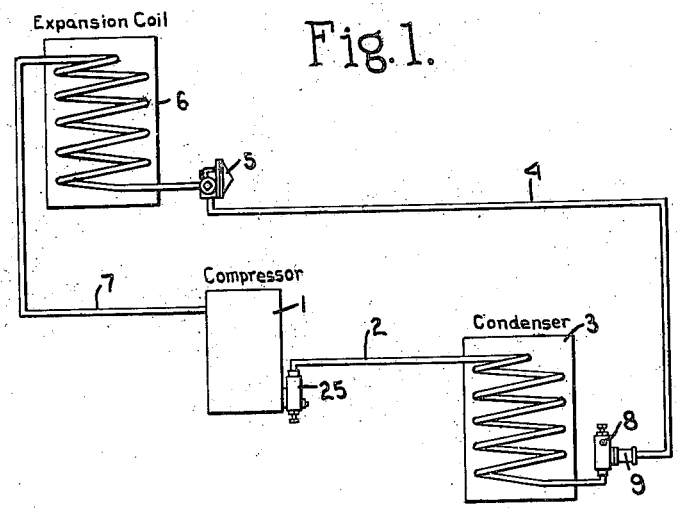
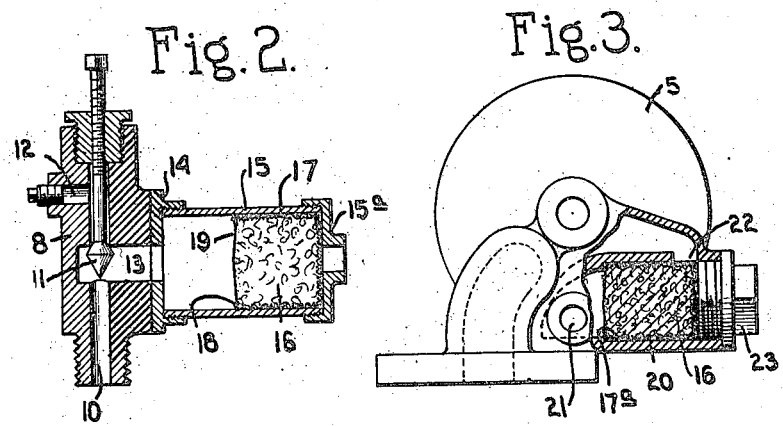
INVENTOR.
Samuel H. Todd
BY
ATTORNEY.

Patented Aug. 28, 1923.

1,466,072

UNITED STATES PATENT OFFICE.

SAMUEL H. TODD, OF DETROIT, MICHIGAN.

REFRIGERATING APPARATUS.

Application filed June 28, 1921. Serial No. 481,012.

*To all whom it may concern:*

Be it known that I, SAMUEL H. TODD, a citizen of the United States, residing at Detroit, in the county of Wayne and State of Michigan, have invented a certain new and useful Improvement in Refrigerating Apparatus, of which the following is a full, clear, and exact description, reference being had to the accompanying drawings.

This invention relates to refrigerating apparatus and has for its objects the provision of a new, improved, and simplified form of trap or filter for removing foreign matter from the refrigerant liquid, and is specially designed for refrigerating apparatus of the domestic type wherein sulphur-dioxide is employed. The objects of the invention are the provision of a filter which shall be inexpensive in construction, unaffected by the refrigerant liquid either when pure or contaminated by the customary impurities, certain and reliable in operation and free from clogging; the provision of a filter so constructed, mounted, and arranged as to be susceptible of easy cleaning notwithstanding the offensive character of the refrigerant; the provision of a filter which shall remove all solid impurities from the refrigerant; while further objects and advantages of the invention will become apparent as the description proceeds.

In a refrigerating apparatus of the customary compressor-condenser-expander type the refrigerant vapor is condensed by cooling after the same has been compressed by a mechanical compressor operating against a flow restricting device which so retards the movement of the refrigerant so as to enable the compressor to produce the necessary pressure. This element is named herein the "retarding device" and may either consist of an automatic reducing valve, a hand operated valve, a constant sized aperture, or a porous member, all of which are of known use in apparatus of this character. These devices are alike in that an accumulation of foreign matter can completely derange the operation of the apparatus, either by clogging the passage therethrough so as to stop the flow or by preventing the seating of the valve so as to render it impossible for the necessary condensing pressure to be secured. For this reason filtering devices are preferably employed to arrest all solid particles but without itself becoming clogged or becoming disintegrated and itself produce a worse contamination than it was created to overcome.

I have discovered that the common sponge (*Eusopogia officinalis poriferae*), if of sufficiently fine texture and purity, such as for example as that sold in commerce under the name "wool sponge" (*Spongia gossypina*) if suitably housed so as to fill completely the passage-way in which it is placed, constitutes a remarkably successful filtering material for this purpose. It is absolutely not affected by sulphur-dioxide, either in liquid or gaseous form, either pure or mixed with air, or containing up to 50 per cent of water. This substance permits the passage of sulphur-dioxide at ease but stops all gritty and metallic particles, and owing to its soft and yielding nature is proof against becoming clogged like a metallic screen. Also owing to its very great surface area its capacity for holding foreign matter is very great.

In the drawings accompanying and forming a part of this application I have illustrated certain physical forms in which my invention can be embodied, but without intent to limit myself to any of the features therein shown except as the same are also recited in my claims. Fig. 1 is a diagrammatic view of a refrigerating system illustrating one mode of applying my improvements; Fig. 2 is an enlarged sectional detail view of one of the traps embodying my improvements; and Fig. 3 is a detail sectional view of a second trap embodying my improvements.

Describing the parts by reference characters, 1 represents a compressor of any suitable type connected by a pipe 2 to the condenser which may be of any suitable type and has its outlet end connected by the pipe 4 to the retarding device 5 which may be of any suitable type. The outlet side of this retarding device is connected to the expansion coil 6 which may be of any suitable type and has its outlet connected by a pipe 7 to the inlet side of the compressor 1. Secured to the outlet end of the condenser is a suitable shutoff valve 8 to which is attached my improved trap 9. As shown in Fig. 2 this valve has a passage-way 10 connected to the condenser and adapted to be closed by the valve 11. It may also have a filling opening 12, though this is not essential to the present improvement. The valve has an outlet passage 13 to which is detachably secured the base 14 of the hollow chamber 15, to the opposite end of which is removably attached the apertured head 15ª communicating with the pipe 4.

The sponge 16 is preferably located in a capsule 17 of screen cloth which fits snugly into the chamber 15, the end of such capsule which is presented toward the inflowing stream being open except for a narrow rim 18. One or two wires 19 may well traverse the open end of the capsule to hold the sponge in place but without impeding the access of liquid thereto. This enables the replacement of capsules with ease in case the sponge becomes filled with sediment and the screen cloth also prevents the passage of grit in case a channel should open through the sponge.

In like manner a filter can be provided adjacent the expansion valve, the body of the same being here shown as provided with a chamber 20 cast therein having at one end the inlet opening 21 adapted for the reception of the pipe 4 and having near the opposite end an outlet port 22 leading to the valve. In this case I have shown a similar capsule 17ª seated near the opening 21 and the other end of the chamber closed by the screw plug 23, which presses the sponge 16 against the separator.

It is sufficient if only one of these traps be employed, although two are preferable. Their proper location is between the condenser and retarding device; and there should be in any event a valve between the condenser and the nearest trap, and also preferably a second similar valve 25 between the compressor and condenser.

In practice the sponge nearest the inlet end of the trap will soon become black with fine metallic particles, that near the outlet end remaining white and clean. When it is desired to cleanse either trap the valve 8 is closed and the compressor operated until all the refrigerant in the entire system is compressed in the condenser, after which either of the traps 9 or 20 can be opened and cleaned substantially without odor. The inlet end of each trap consists of an empty chamber for sediment. The valve 25 would be unnecessary in case the compressor valves were absolutely tight, but it is best to use it to minimize leakage from this source. As soon as the traps are cleaned and reattached to the system the valves can be opened and the system operated as before.

I claim both the use of sponge as a filtering substance, regardless of the mechanical construction of the apparatus and also such mechanical construction regardless of the nature of the filtering material. Even as to sponge I do not limit myself to any one species or quality since many varieties of the *phylum porifera* are suitable. The variety known on the market as "sheep's wool" (*Spongia gossypina*) is the best but the yellow sponges are practically as good (*Enspongia officinalis*) and the material can be used either in its natural integral state when sufficiently dense or can be comminuted and packed together if a coarser variety be employed.

Having thus described my invention what I claim is:

1. The combination with refrigerating apparatus employing sulphur dioxide as a working fluid, of a filter consisting of common sponge (*porifera*) compressed in a casing and located in the line of flow of the liquid refrigerant.

2. In refrigerating apparatus, the combination with a compressor, a condenser, a retarding device, and an expansion coil connected together in a closed system in the order named, and having a charge of sulphur dioxide therein, of a filtering chamber located between said condenser and said retarding device, and sponge (*porifera*) contained in said chamber as a filtering material.

3. In refrigerating apparatus, the combination with a compressor, a condenser, a retarding device, and an expansion coil connected together in a closed system in the order named, and having a charge of sulphur dioxide therein, of a filtering chamber located between said condenser and said retarding device, a perforated separator in said chamber, a removable closure for the outlet end of said chamber, and a sponge (*porifera*) held in the chamber by said separator.

4. In refrigerating apparatus, the combination with a compressor, a condenser, a hollow member, a retarding device, and an expansion coil connected together in a closed system in the order named and having a charge of sulphur dioxide therein, of a perforated separator in said hollow member, a shut off valve between said condenser and said inlet chamber, a removable closure for said hollow member, and sponge (*Spongia gossypina*) in said hollow member.

In testimony whereof, I hereunto affix my signature.

SAMUEL H. TODD